United States Patent [19]

Nakamori

[11] Patent Number: 5,787,646
[45] Date of Patent: Aug. 4, 1998

[54] DOOR PANEL CONSTRUCTION AND METHOD OF MANUFACTURING DOOR PANEL

[75] Inventor: Yoji Nakamori, Tokyo, Japan

[73] Assignee: Mitsubishi Jidosha Kogyo Kabushiki Kaisha, Tokyo, Japan

[21] Appl. No.: 682,744

[22] PCT Filed: Nov. 24, 1995

[86] PCT No.: PCT/JP95/02392

§ 371 Date: Jul. 31, 1996

§ 102(e) Date: Jul. 31, 1996

[87] PCT Pub. No.: WO96/16828

PCT Pub. Date: Jun. 6, 1996

[30] Foreign Application Priority Data

Dec. 2, 1994 [JP] Japan ................................. 6-299299

[51] Int. Cl.⁶ .................................................. B60J 5/04
[52] U.S. Cl. .................. 49/502; 49/506; 296/146.5; 29/467; 29/897.2
[58] Field of Search ............... 296/146.5, 146.6, 296/146.7; 49/502, 506; 29/281.1, 281.5, 464, 467, 897.2

[56] References Cited

U.S. PATENT DOCUMENTS

| | | | |
|---|---|---|---|
| 4,648,208 | 3/1987 | Baldamus et al. | 49/502 |
| 5,095,659 | 3/1992 | Benoit et al. | 49/502 |
| 5,325,632 | 7/1994 | Djavairian et al. | 49/502 |

FOREIGN PATENT DOCUMENTS

| | | | |
|---|---|---|---|
| 495712 | 7/1992 | European Pat. Off. | 49/502 |
| 3402135 | 7/1985 | German Dem. Rep. | 49/502 |
| 3608506 | 11/1987 | German Dem. Rep. | 49/502 |
| 405058158 | 3/1993 | Japan | 296/146.5 |
| 406108730 | 4/1994 | Japan | 49/349 |
| 406183258 | 7/1994 | Japan | 296/146.6 |

*Primary Examiner*—Jose V. Chen
*Assistant Examiner*—Hanh V. Tran

[57] ABSTRACT

Location pins are fitted into a plurality of sets of reference holes so that an inner panel, a hinge panel and a belt-like reinforcement which make up an inner panel assembly of a door panel are positioned in all directions with respect to each other. In addition, the inner panel assembly and an outer panel are mutually positioned using location pins, so that the mutual positions of all of the components of a door panel are fixed with a high degree of accuracy to produce a door panel of a high quality. Fittings may then be accurately mounted across the components of the door panel. With this arrangement, a door of high quality is ensured with less labor and fewer positioning members.

7 Claims, 4 Drawing Sheets

DOOR PANEL CONSTRUCTION AND METHOD OF MANUFACTURING DOOR PANEL

FIELD OF THE INVENTION

The present invention relates to door panel construction and a method of manufacturing a door panel, more particularly it relates to improving the accuracy in the mutual attachment or connections between components of a door panel.

DESCRIPTION OF THE RELATED ART

In general, a door panel for use in motor vehicles is constructed in such a manner that an inner panel, a hinge panel and a belt-like reinforcement are joined together by means of a welding process to produce an inner panel assembly which, in turn, is joined to an outer panel using a hemming processes. The door panel is equipped with a locking system for locking and unlocking the door and a glass operating system for elevating and supporting window glass. The fittings of each system are mounted across or between parts making up the door panel, and hence the quality of the door itself is affected by the accuracy of the fit between parts comprising the inner panel assembly and the accuracy of the fit between the inner panel assembly and outer panel. Of the fittings of the locking system, a latch is fitted into the inner panel, a door outer handle is mounted on the outer panel, and a hinge is installed on the hinge panel. In addition, the latch and the door outer handle are coupled through a control rod to each other. Therefore, if the inner panel and outer panel are shifted relative to each other or if the inner panel and the hinge panel are shifted with respect to each other, the timing of the locking or unlocking responsive to the movement of the door outer handle varies, thus impairing the sensation of operation or making door opening and closing failures occur.

Moreover, of the fittings of the glass operating system, a regulator for guiding the elevation of the glass is installed across the inner panel to the belt-like reinforcements, and an inner stabilizer for holding the glass is mounted on the belt-like reinforcement. In addition, in the case of a sashless door, an up-stop for limiting the top dead center of the glass is attached to the belt-like reinforcement. Thus, if the parts comprising the inner panel assembly are not aligned with each other, the window glass fails to elevate or the window glass comes into contact with a weatherstrip in such manner as to spoil the sealing function.

For these reasons, for the formation of the door panel, the inner panel, the hinge panel and the belt-like reinforcement have heretofore been welded to each other by means of a special welding tool (jig) to form the inner panel assembly, and the inner panel and the outer panel are joined to each other on a hemming table. The welding tool is provided with a locator or a location pin useful to individually position the inner panel, the hinge panel and the belt-like reinforcement so that the respective parts are positioned with respect to the welding tool before the inner panel assembly is completed by the spot welding technique. Like the welding tool, the hemming table is provided with a means for positioning the inner panel assembly and the outer panel so that the inner panel assembly and outer panel are positioned with respect to the hemming table and then pressed by an upper mold before the hemming process is performed so that the inner panel assembly and the outer panel are joined to each other to produce the door panel. Thus, movement between the parts composing the door panel does not occur, which keeps the quality of the door high.

In the above-mentioned prior door panel construction or structure, since the positional relation between the parts forming the inner panel assembly is made on the welding tool and the positional relation between the inner panel assembly and the outer panel is made on the hemming table, the positional relation between the parts comprising the door panel does not vary. However, since the positioning of the parts making up the door panel are made in relation to the welding tool and separately on the hemming table, in fact complete alignment of the parts making up the door panel is not accomplished. In addition, the separate positioning of the parts requires much labor and requires a large number of locators or location pins.

SUMMARY OF THE INVENTION

It is therefore an object of the present invention to provide a door panel construction and door panel manufacturing method which are capable of aligning the parts for a door panel with less labor and with fewer positioning members, but which results in a door panel with a high quality.

A door panel construction according to a first aspect of the invention has an inner panel assembly comprising an inner panel, a hinge panel and a belt-like reinforcement, and an outer panel joined to each other, wherein reference holes are made to be common to the inner panel, the hinge panel and the belt-like reinforcement, and the reference holes accept a location pin installed on a welding tool.

In accordance with the invention, since the location pin on the welding tool is inserted into the reference holes, the positioning of the parts making up the inner panel assembly can be achieved with a high accuracy.

A door panel construction according to a second aspect of the invention has an inner panel assembly comprising an inner panel, a hinge panel and a belt-like reinforcement, and an outer panel joined to each other, wherein reference holes which are in coaxial relation to each other are made to be common to the inner panel, the hinge panel and the belt-like reinforcement, and second holes which are in coaxial relation to each other are made to be common to the inner panel and the belt-like reinforcement, so that the inner panel assembly is formed using the reference holes and the second holes. Third holes which are in coaxial relation to each other are made to be common to the hinge panel and the outer panel so that the inner panel assembly and the outer panel are joined to each other using the third holes, wherein the third hole of the outer panel is made in a molding mounting section.

According to the invention, since the reference holes are coaxially made to be common to the inner panel, the hinge panel and belt-like reinforcement and the second holes are coaxially made to be common to the inner panel and belt-like reinforcement, the inner panel assembly is formed using the reference holes and the second holes. The third holes are coaxially made to be common to the hinge panel and the outer panel so that the inner panel assembly and the outer panel are joined to each other using the third holes in a such a manner that the positioning pins are respectively inserted into the reference holes and the second and third holes. The positioning of the belt-like reinforcement in its plane direction and in its rotating direction can be accomplished with respect to the inner panel, the positioning of the hinge panel in its plane direction and in its rotating direction can be achieved with respect to the inner panel, and the positioning of the outer panel in its plane direction is effected with respect to the inner panel assembly. Accordingly, it is possible to accurately position the inner panel assembly and each component of the door panel relative to the other parts with less labor and with fewer positioning tools, and also to mount the fittings with great accuracy to ensure the door quality. In addition, since the third holes are made in a molding mounting area, the holes are not visible or exposed to the exterior of the motor vehicle.

A door panel construction according to a third aspect of the invention has an inner panel assembly comprising an inner panel, a hinge panel and a belt-like reinforcement, and an outer panel joined to each other. Reference holes which are in coaxial relation to each other are made to be common to the inner panel, the hinge panel and the belt-like reinforcement, and second holes which are in coaxial relation to each other are made to be common to the inner panel and the belt-like reinforcement, so that the inner panel assembly is formed using the reference holes and the second holes. Third holes which are in coaxial relation to each other are made to be common to the hinge panel and the outer panel and fourth holes which are in coaxial relation to each other are made to be common to the inner panel and the outer panel, so that the inner panel assembly and the outer panel are joined to each other using the third and fourth holes. The fourth holes at the inner panel assembly side are used as the aforesaid reference holes. The third and fourth holes of the outer panel are made in a molding mounting area.

According to the invention, since the reference holes are coaxially made to be common to the inner panel, the hinge panel and belt-like reinforcement and the second holes are coaxially made to be common to the inner panel and belt-like reinforcement, the inner panel assembly is formed using the reference holes and the second holes. The third holes are coaxially made to be common to the hinge panel and the outer panel and the fourth holes are coaxially made to be common to the inner panel and the outer panel so that the inner panel assembly and the outer panel are joined to each other using the third and fourth holes. When the positioning pins are fitted into the reference holes and the second and third holes and a different common positioning pin is inserted into the fourth holes, the positioning of the belt-like reinforcement in its plane direction and in its rotating direction is accomplished with respect to the inner panel, the positioning of the hinge panel in its plane direction and in its rotating direction is achieved with respect to the inner panel, and the positioning of the outer panel in its plane direction and in its rotating direction is effected with respect to the inner panel assembly. Accordingly, it is possible to accurately position the inner panel assembly and the door panel components in all directions relative to each other with less labor and without use of a special positioning tool, and further to mount the fittings with a high degree of accuracy to assure high door quality. In addition, the use of the reference holes and the fourth holes in common permits reduction of the number of holes and positioning pins. Further, the formation of the third and fourth holes in the molding mounting area can prevent the holes from being visible or exposed to the exterior of the motor vehicle.

A door panel construction according to a fourth aspect of the invention has an inner panel assembly, comprising an inner panel, a hinge panel and a belt-like reinforcement, and an outer panel joined to each other. Reference holes which are in coaxial relation to each other are made to be common to the inner panel, the hinge panel and the belt-like reinforcement, and second holes which are in coaxial relation to each other are made to be common to the inner panel and the belt-like reinforcement so that the inner panel assembly is formed using the reference holes and the second holes, and is joined to the outer panel.

According to the invention, since the reference holes are coaxially made to be common to the inner panel, the hinge panel and belt-like reinforcement and the second holes are coaxially made to be common to the inner panel and belt-like reinforcement, the inner panel assembly is formed using the reference holes and the second holes and is joined to the outer panel. When the common positioning pins are respectively fitted into the reference holes and the second holes, the belt-like reinforcement is positioned in its plane direction and in its rotating direction with respect to the inner panel, and the hinge panel is positioned in its plane direction relative to the inner panel. Accordingly, it is possible to accurately position the components of the inner panel assembly relative to each other with less labor and to provide a door panel with high accuracy and quality with fewer positioning tools. In addition, it is possible to mount the fittings with a high degree of accuracy to ensure the door quality stably.

A door panel construction according to a fifth aspect of the invention has an inner panel assembly comprising an inner panel, a hinge panel and a belt-like reinforcement, and an outer panel joined to each other. Third holes which are in coaxial relation to each other are made to be common to the hinge panel and the outer panel. Fourth holes which are in coaxial relation to each other are made to be common to the inner panel and the outer panel, so that the inner panel assembly and the outer panel are joined to each other using the third and fourth holes.

According to the invention, since the third holes are coaxially made to be common to the hinge panel and the outer panel and the fourth holes are coaxially made to be common to the inner panel and the outer panel, the inner panel assembly and the outer panel are joined to each other using the third and fourth holes. When the positioning pins are respectively fitted into the third and fourth holes, the outer panel is positioned in its plane direction and in its rotating direction relative to the inner panel assembly. Thus, it is possible to accurately position the inner panel assembly and the outer panel with respect to each other with less labor and with fewer positioning tools, and to mount the fittings with a high degree of accuracy to achieve high door quality.

In accordance with a sixth aspect of the invention, in a method manufacturing a door panel which comprises an inner panel assembly, having an inner panel, a hinge panel and a belt-like reinforcement, and an outer panel joined to each other, reference holes are made to be common to the inner panel, the hinge panel and the belt-like reinforcement, and positioning is achieved by a location pin installed on a welding tool which is inserted into the reference holes, and the inner panel, the hinge panel and the belt-like reinforcement are welded to each other, thus producing the inner panel assembly.

In accordance with a seventh aspect of the invention, in a method of manufacturing a door panel which comprises an inner panel assembly, having an inner panel, a hinge panel and a belt-like reinforcement, and an outer panel joined to each other, reference holes are made to be common to the inner panel, the hinge panel and the belt-like reinforcement, second holes are made to be common to the inner panel and the belt-like reinforcement, and positioning is achieved by location pins installed on a welding tool which are respectively inserted into the reference holes and the second holes, and the inner panel, the hinge panel and the belt-like reinforcement are welded to each other to produce the inner panel assembly. Third holes are made to be common to the hinge panel and the outer panel and positioning is achieved by a manner that a location pin installed on a table of a hemming tool which is inserted into the third holes so that the inner panel assembly and the outer panel are integrally joined to each other by a hemming process.

BRIEF DESCRIPTION DRAWINGS

DETAILED DESCRIPTION OF A PREFERRED EMBODIMENT

Figure 1:
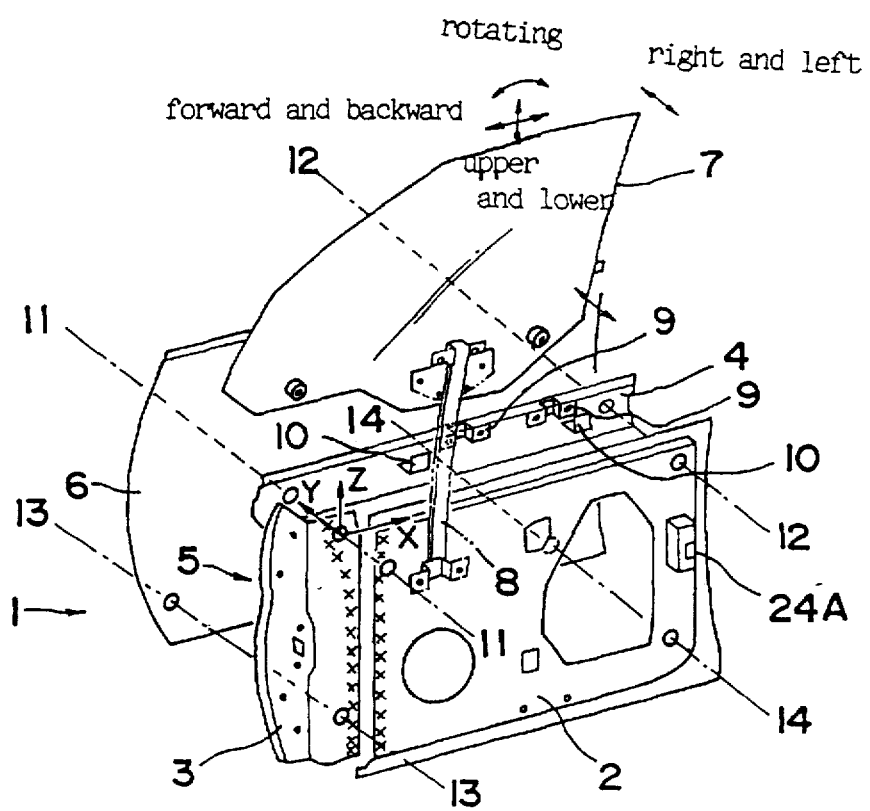
FIG. 1 is an exploded perspective view showing a door panel construction according to an embodiment of the present invention.
Figure 2:
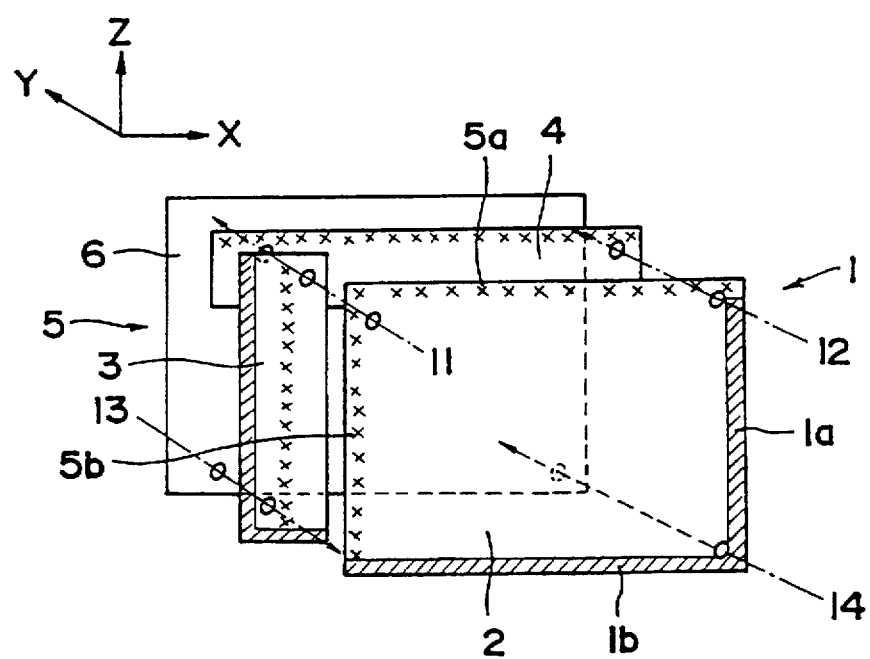
FIG. 2 is an illustration useful for explaining joined states of panels.

Referring now to the drawings, a detailed description will be made hereinbelow of the present invention. As shown in FIGS. 1 and 2, a door panel 1 is composed of an inner panel assembly 5, comprising an inner panel 2, a hinge panel 3 and a belt-like reinforcement 4, and an outer panel 6, which are joined to each other. In the inner panel assembly 5, the inner panel 2, the hinge panel and the belt-like reinforcement 4 are joined to each other in such a way that its upper edge 5a and its front edge 5b (left side in the illustration) are spot-welded. The inner panel assembly 5 and the outer panel 6 are joined to each other in such a manner that its rear edge 1a (right side in the illustration) and a lower edge 1b are joined by hemming. In the door panel 1, a latch 24A is attached as a fitting of a locking system to the inner panel 2, and a door outer handle (not shown) is fitted onto the outer panel 6. A hinge (not shown) is installed onto the hinge panel 3. In addition, in the door panel 1, as shown in FIG. 1 a regulator 8 for guiding a, glass 7 for raising and lowering is mounted across the inner panel 2 to the belt-like reinforcement 4 as a fitting of a glass operating system, while an inner stabilizer 9 for holding the glass 7 is attached to the belt-like reinforcement 4. Further, in the case of a sashless door, an up-stop 10 is mounted on the belt-like reinforcement 4 to limit the top dead center of the glass 7.

In a front upper end portion of the inner panel assembly 5, there are formed reference holes 11 which are in coaxial relation to each other and which are used in common to (used as a set of holes coaxially made in) the inner panel 2, the hinge panel 3 and the belt-like reinforcement 4. In a rear upper end portion of the inner panel assembly 5 there are formed second holes 12 which are in coaxial relation to each other and which are used in common to the inner panel 2 and the belt-like reinforcement 4. In addition, in a front lower end portion of the door panel 1 there are made third holes 13 which are in coaxial relation to each other and which are used in common to the hinge panel 3 and the outer panel 6. In a rear lower end portion of the door panel 1 there are made fourth holes 14 which are in coaxial relation to each other and which are used in common to the inner panel 2 and the outer panel 6. In the inner panel assembly 5, common location pins are inserted into the reference holes 11 and the second holes 12, respectively, so that the positioning is accomplished among the inner panel 2, the hinge panel 3 and the belt-like reinforcement 4. In the door panel 1, the inner panel assembly 5 and the outer panel 6 are positioned by common location pins which are inserted into the third holes 13 and the fourth holes 14, respectively.

Figure 3:
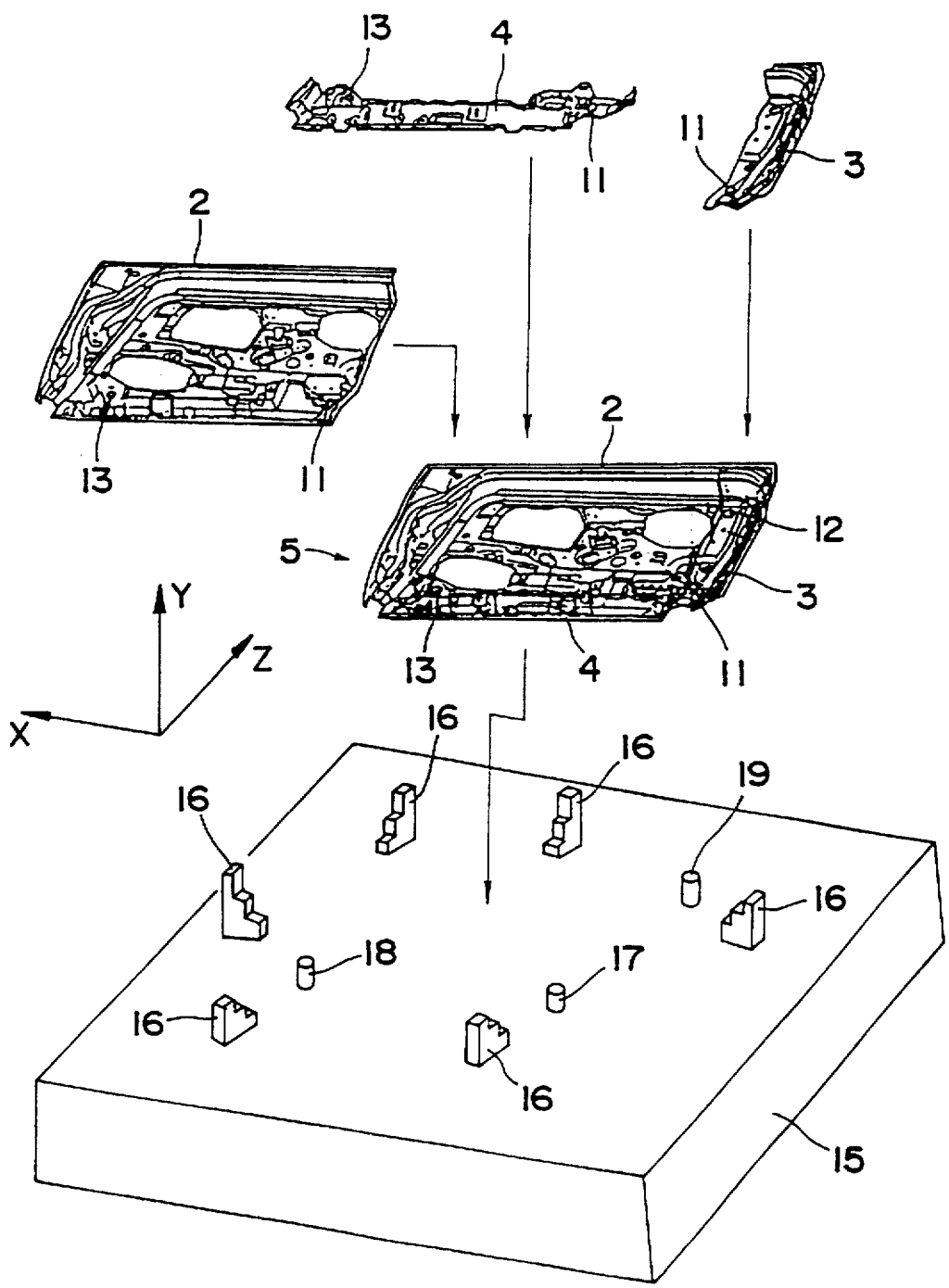
FIG. 3 is a exploded perspective view showing the relationship between a welding tool and inner panel assembly 5.
Figure 4:
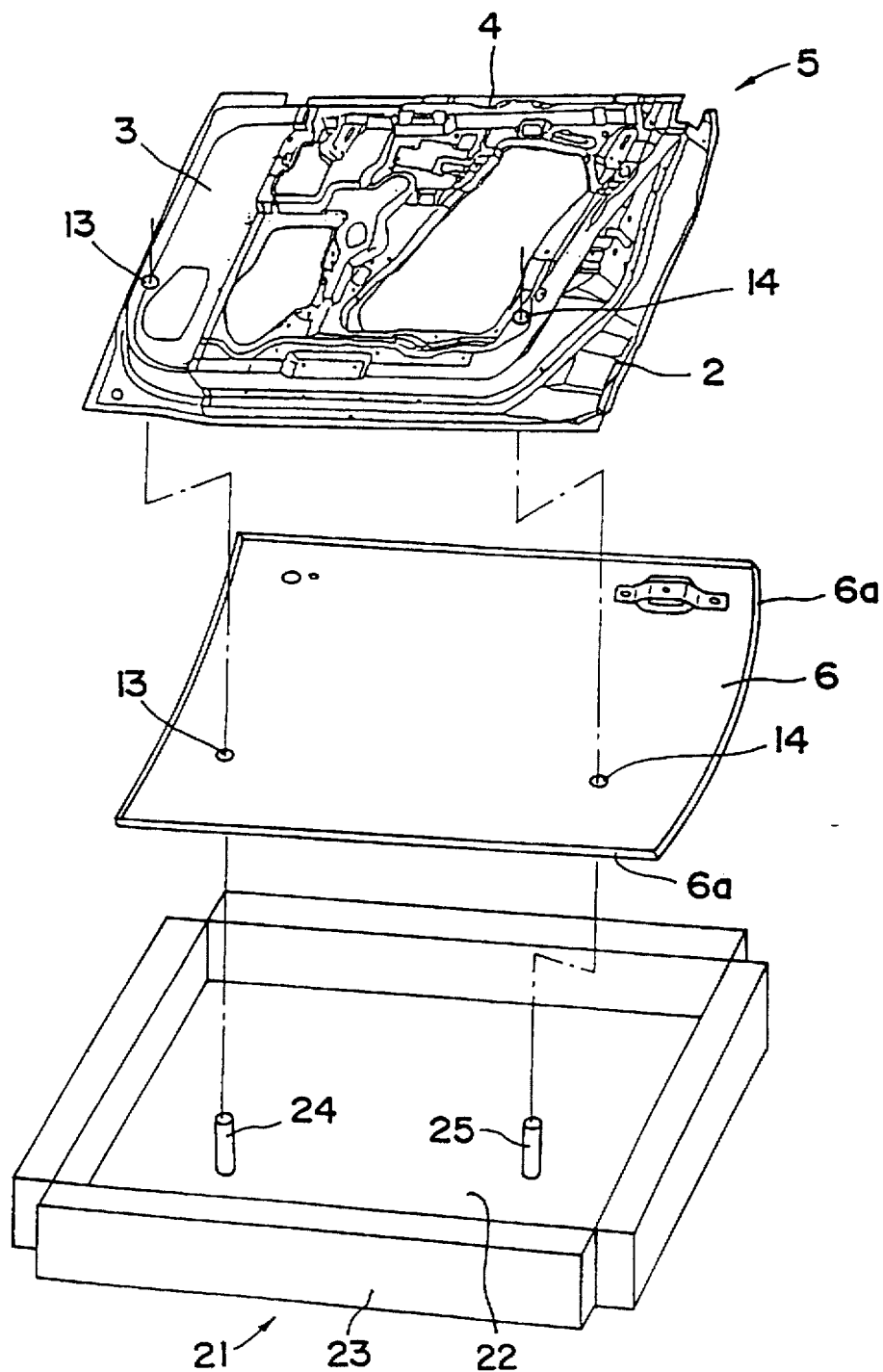
FIG. 4 is an exploded perspective view showing the relationship between a hemming tool and a door panel 1.

Referring to FIGS. 3 and 4, a description will be made hereinbelow of a welding operation for the inner panel assembly 5 and a joining operation for the door panel 1. As shown in FIG. 3, a welding tool 15 is equipped with a plurality of locators 16 for holding the inner panel assembly 5. A location pin 17 is provided for cooperation with the reference holes 11. A location pin 18 is provided for the second holes 12, and a location pin 19 is provided to be fitted into the third hole 13 of the hinge panel 3. The location pins 17, 18 and 19 are fitted into the reference holes 11, the second holes 12 and the third holes 13, respectively, to hold the inner panel assembly 5 on the welding tool 15, so that the inner panel 2, the hinge panel 3 and the belt-like reinforcement 4 are mutually positioned and held thereon. In a state wherein the inner panel 2, the hinge panel 3 and the belt-like reinforcement 4 are mutually positioned and held thereon, spot welding is carried out to form the inner panel assembly 5.

When the location pin 17 is fitted into the reference holes 11, the inner panel 2, the hinge panel 3 and the belt-like reinforcement 4 are positioned in the X-Z directions (see FIGS. 1-2). When the location pin 18 is inserted into the second holes 12, rotation of the inner panel 2 and the belt-like reinforcement 4 about the Y axis is prevented. In addition, when the location pin 19 is fitted into the third holes 13, rotation of the hinge panel 3 about the Y axis is prevented. Accordingly, when the location pin 17 is fitted into the reference holes 11, the location pin 18 is fitted into the second holes 12, and the location pin 19 is fitted into the third holes 13, the belt-like reinforcement 4 is positioned in its plane direction and in its rotating direction with respect to the inner panel 2, and the hinge panel 3 is positioned in its plane direction and in its rotating direction relative to the inner panel 2. When the position of the belt-like reinforcement 4 becomes stable relative to the inner panel 2, it is possible to accurately mount the regulator 8, the inner stabilizer 9 and the up-stop 10, so that elevation failures of the glass 7, opening and closing failures of the door due to variations of the position of the closed glass 7, and sealing failure do not occur, and the raising and lowering of the glass 7 functions properly. Moreover, since the position of the hinge panel becomes stable with respect to the inner panel, a hinge (not shown) can be fitted with a high accuracy, thus enhancing the performance of the door in opening and closing.

As shown in FIG. 4, a lower pattern 23 for holding the circumferential edge portion of the outer panel 6 is provided on a hemming table 22 of a hemming tool 21. A location pin 24 common to the third holes 13 of the outer panel 6 and the inner panel assembly 5 and a location pin 25 common to the fourth holes 14 thereof are also provided on the hemming table 22. When the location pins 24, 25 are inserted into the third and fourth holes 13, 14 respectively, so that the outer panel 6 and the inner panel assembly 5 are held on the hemming tool 21, the outer panel 6 and the inner panel assembly 5 are mutually positioned and held. Further, a hem flange 6a is formed on the circumferential edge portion of the outer panel 6, and if an upper pattern (not shown) is pressed against the lower pattern 23 after the outer panel 6 and the inner panel assembly 5 are positioned, the hem flange 6a is folded along the circumferential edge portion of the inner panel assembly 5 to be hemming-processed.

When the location pin 24 is fitted into the third holes 13, the positions of the outer panel 6 and the inner panel assembly 5 in the X-Z direction is fixed, and when the location pin 25 is inserted into the fourth holes, rotation of the outer panel 6 and the inner panel assembly 5 about the Y axis is prevented. Thus, where the location pin 24 is fitted into the third holes 13 and the location pin 25 is fitted into the fourth holes 14, the inner panel assembly 5 is positioned in its plane direction and in its rotating direction relative to the outer panel 6. Thus, the relative positional accuracy between the door outer handle (not shown) mounted on the outer panel 6 and a latch 24A mounted on the inner panel 2 is improved and troubles such as opening and closing failures of the door, operation failure of the door outer handle and locking and unlocking failures thereof do not occur. Moreover, ease of operation of the door outer handle is improved.

The positions of the third holes 13 and the fourth holes 14 in the outer panel 6 correspond to the sections on the outside panel 6 where door molding is to be mounted. Hence, the appearance of the door is not impaired. In a modification of these embodiments, when the fourth hole 14 of the outer panel 6 is made to coincide in position with the reference holes 11 of the inner panel assembly 5, the fourth hole 14 of the inner panel 2 may be omitted, thus reducing the number of alignment pins. However, the position of the third hole 13 of the outer panel 6 is required to be located in a portion of the door on which molding is to be mounted or a portion which otherwise becomes concealed. According to the invention, the inner panel assembly 5 and the outer panel 6 are positioned using the locators, and it is possible to reduce the number of the locators as compared with the prior art.

In the aforementioned embodiments, the reference holes 11 are in coaxial relation to each other and have a circular configuration, while the other holes 12 to 14 can be of a different configuration such as an elongated hole as long as rotation of the parts can be prevented.

According to the above-described door panel construction and door panel manufacturing method, the inner panel 2, the hinge panel 3 and the belt-like reinforcement 4, which make up the inner panel assembly 5, are mutually positioned in all directions, i.e., in the forward and backward directions, in the right and left directions, in the upper and lower directions, and in the rotating directions as indicated by arrows in FIG. 1. In addition, since the inner panel assembly 5 and the outer panel are mutually positioned, it is possible to mutually position these components with a high degree of accuracy. Thus, it is possible to accurately mount the fittings across the components to improve the door quality. Moreover, since the holes 11 and 14 are usable as the reference holes for setting the tool for the positioning tests and measurements of the fittings, mounting the fittings becomes simplified.

What is claimed is:

1. A door panel having an inner panel assembly including an inner panel, a hinge panel, and a belt-like reinforcement, and an outer panel joined to the inner panel assembly, comprising:

reference holes to be coaxially aligned with each other and common to said inner panel, said hinge panel, and said belt-like reinforcement;

second holes to be coaxially aligned with each other and common to said inner panel, and said belt-like reinforcement, whereby said inner panel assembly is formed using said reference holes and said second holes; and third holes to be coaxially aligned with each other and common to said hinge panel and said outer panel, whereby said inner panel assembly and said outer panel are joined to each other using said third holes.

2. A door panel as defined in claim 1, wherein said third hole of said outer panel is formed in a section of said outer panel where a molding is to be mounted.

3. A door panel having an inner panel assembly including an inner panel, a hinge panel, and a belt-like reinforcement, and an outer panel joined to the inner panel assembly, comprising:

reference holes to be coaxially aligned with each other and common to said inner panel, said hinge panel, and said belt-like reinforcement;

second holes to be coaxially aligned with each other and common to said inner panel and said belt-like reinforcement, whereby said inner panel assembly is formed using said reference holes and said second holes;

third holes to be coaxially aligned with each other and common to said hinge panel and said outer panel; and fourth holes to be coaxially aligned with each other and common to said inner panel and said outer panel, whereby said inner panel assembly and said outer panel are joined to each other using said third holes and said fourth holes.

4. A door panel as defined in claim 3, wherein said reference holes also serve as said fourth holes.

5. A door panel as defined in claim 3, wherein said third and fourth holes of said outer panel are formed in a section of said outer panel where a molding is to be mounted.

6. A method of manufacturing a door panel having an inner panel assembly including an inner panel, a hinge panel, and a belt-like reinforcement, and an outer panel joined to the inner panel assembly, comprising:

providing reference holes common to said inner panel, said hinge panel, and said belt-like reinforcement;

inserting a location pin associated with a welding tool into said reference holes to fix positions of said inner panel, said hinge panel, and said belt-like reinforcement; and welding said inner panel, said hinge panel, and said belt-like reinforcement together to produce said inner panel assembly.

7. In a method of manufacturing a door panel having an inner panel assembly including an inner panel, a hinge panel, and a belt-like reinforcement, and an outer panel joined to the inner panel assembly, comprising:

providing reference holes common to said inner panel, said hinge panel, and said belt-like reinforcement;

providing second holes common to said inner panel, said hinge panel, and said belt-like reinforcement;

inserting location pins associated with a welding tool into said reference holes and said second holes, respectively, to fix positions of said inner panel, said hinge panel, and said belt-like reinforcement;

welding said inner panel, said hinge panel, and said belt-like reinforcement together to produce said inner panel assembly;

providing third holes common to said hinge panel and said outer panel;

inserting a location pin associated with a table of a hemming tool into said third holes; and joining said inner panel assembly to said outer panel by a hemming process.

* * * * *

UNITED STATES PATENT AND TRADEMARK OFFICE
CERTIFICATE OF CORRRECTION

PATENT NO. : 5,787,646
DATED : August 4, 1998
INVENTOR(S) : Yoji Nakamori It is certified that error appears in the above-identified patent and that said Letters Patent is hereby corrected as shown below:

On the title page, item [56], add the following references:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 4 | 7 | 6 | 1 | 9 | 1 | 5 | 08/09/1988 | MARZ | | | |
| | | | | | | | | | | | | | |

FOREIGN PATENT DOCUMENTS

| | | DOCUMENT NUMBER | | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|---|
| | | 0 | 4 | 9 | 2 | 3 | 55 | A1 | 07/01/1992 | EP | | | | |
| | | 03 | 0 | 8 | 7 | 2 | 4 | 3A | 04/12/1991 | JP | | | | |
| | | | | | | | | | | | | | | |

Signed and Sealed this

Sixteenth Day of March, 1999

Attest:

Q. TODD DICKINSON

*Attesting Officer*

*Acting Commissioner of Patents and Trademarks*